(12) United States Patent
Guo et al.

(10) Patent No.: US 12,437,140 B2
(45) Date of Patent: Oct. 7, 2025

(54) LAYOUT STRUCTURE OF CLOCK TREE CIRCUITRY AND FORMING METHOD THEREOF

(71) Applicant: CHANGXIN MEMORY TECHNOLOGIES, INC., Hefei (CN)

(72) Inventors: Yingdong Guo, Hefei (CN); Jing Xu, Hefei (CN); Wei Jiang, Hefei (CN); Xue Shan, Hefei (CN)

(73) Assignee: CHANGXIN MEMORY TECHNOLOGIES, INC., Hefei (CN)

( * ) Notice: Subject to any disclaimer, the term of this patent is extended or adjusted under 35 U.S.C. 154(b) by 709 days.

(21) Appl. No.: 17/805,921

(22) Filed: Jun. 8, 2022

(65) Prior Publication Data

US 2023/0214572 A1   Jul. 6, 2023

Related U.S. Application Data

(63) Continuation of application No. PCT/CN2022/074498, filed on Jan. 28, 2022.

(30) Foreign Application Priority Data

Dec. 30, 2021   (CN) .......................... 202111656065.8

(51) Int. Cl.
*G06F 30/396* (2020.01)
*G06F 30/392* (2020.01)
(Continued)

(52) U.S. Cl.
CPC .......... *G06F 30/396* (2020.01); *G06F 30/392* (2020.01); *G06F 30/394* (2020.01); *H01L 21/00* (2013.01); *H01L 25/00* (2013.01)

(58) Field of Classification Search
CPC .... G06F 30/396; G06F 30/392; G06F 30/394; H01L 21/00; H01L 25/00
(Continued)

(56) References Cited

U.S. PATENT DOCUMENTS

| 4,677,498 A * | 6/1987 | Tsushima | H04N 9/81 |
| | | | 386/300 |
| 4,727,318 A * | 2/1988 | Sakai | G01R 31/2603 |
| | | | 324/762.08 |

(Continued)

FOREIGN PATENT DOCUMENTS

| CN | 1901427 B | * | 9/2012 | ............... G06F 1/10 |
| CN | 204578499 U | * | 8/2015 | |

(Continued)

OTHER PUBLICATIONS

Feng et al., Chinese Patent Document No. CN-113315493-A, published Aug. 27, 2021, 3 pages including abstract and 1 drawing. (Year: 2021).*

*Primary Examiner* — Phallaka Kik
(74) *Attorney, Agent, or Firm* — Kilpatrick Townsend & Stockton LLP

(57) ABSTRACT

The present disclosure relates to a clock tree layout and a forming method thereof. The clock tree layout includes: a divider module layout, a phase module layout and a wire pattern layer. The divider module layout is configured to receive a first clock signal, and divide the first clock signal, and obtain a plurality of second clock sampling signals phase-associated; the phase module layout includes a first quantity of phase modules disposed in a first preset direction, the phase module is configured to generate a second clock signal based on a correspondingly connected second clock sampling signal, and the phase modules are symmetrically distributed with respect to the divider module layout; the wire pattern layer is configured to electrically connect the phase module and a divider module in the divider module layout; a difference between phases of any two of the second clock signals falls within a preset precision range.

20 Claims, 8 Drawing Sheets

(51) Int. Cl.
*G06F 30/394* (2020.01)
*H01L 21/00* (2006.01)
*H01L 25/00* (2006.01)

(58) Field of Classification Search
USPC ..... 716/104, 118, 122, 126; 703/14; 326/41, 326/47, 96, 101
See application file for complete search history.

(56) References Cited

U.S. PATENT DOCUMENTS

| | | | | |
|---|---|---|---|---|
| 5,517,147 | A * | 5/1996 | Burroughs | G06F 1/06 |
| | | | | 327/295 |
| 6,204,713 | B1 * | 3/2001 | Adams | G06F 30/396 |
| | | | | 327/295 |
| 6,452,421 | B2 * | 9/2002 | Saito | G06F 13/423 |
| | | | | 326/96 |
| 7,089,439 | B1 * | 8/2006 | Abdollahi-Alibeik | G06F 1/10 |
| | | | | 713/400 |
| 7,620,133 | B2 * | 11/2009 | Cafaro | H03K 5/133 |
| | | | | 327/144 |
| 10,177,147 | B2 | 1/2019 | Chen | |
| 2002/0057602 | A1 * | 5/2002 | Huber | G11C 7/222 |
| | | | | 365/194 |
| 2006/0098771 | A1 * | 5/2006 | Cafaro | H03K 5/133 |
| | | | | 375/371 |
| 2013/0043918 | A1 * | 2/2013 | Ma | H03L 7/0816 |
| | | | | 327/158 |
| 2013/0262073 | A1 | 10/2013 | Asaad et al. | |
| 2014/0118041 | A1 * | 5/2014 | Ma | H03L 7/0816 |
| | | | | 327/158 |
| 2016/0336316 | A1 * | 11/2016 | Chen | H10D 89/10 |
| 2017/0244393 | A1 | 8/2017 | Bagger | |
| 2022/0094516 | A1 * | 3/2022 | Zhang | H04B 17/21 |

FOREIGN PATENT DOCUMENTS

| | | | | |
|---|---|---|---|---|
| CN | 106155181 | A | 11/2016 | |
| CN | 106777437 | A | 5/2017 | |
| CN | 112084733 | A | 12/2020 | |
| CN | H01117411 | A * | 8/2021 | ........... H03K 19/173 |
| CN | 113657065 | A | 11/2021 | |
| EP | 0127172 | B1 * | 3/1990 | ............... H03K 5/14 |
| EP | 1746481 | A2 * | 1/2007 | ............... G06F 1/10 |
| JP | H02273816 | A * | 11/1990 | ............... G06F 1/10 |
| JP | 09284250 | A * | 10/1997 | |
| JP | 3401610 | B2 * | 4/2003 | |
| TW | I339499 | B * | 3/2011 | ......... H03K 19/1732 |
| WO | 2021146946 | A1 | 7/2021 | |

* cited by examiner

LAYOUT STRUCTURE OF CLOCK TREE CIRCUITRY AND FORMING METHOD THEREOF

CROSS-REFERENCE TO RELATED APPLICATIONS

This is a continuation of International Application No. PCT/CN2022/074498, filed on Jan. 28, 2022, which claims the priority to Chinese Patent Application 202111656065.8, filed with China National Intellectual Property Administration (CNIPA) on Dec. 30, 2021. The entire contents of International Application No. PCT/CN2022/074498 and Chinese Patent Application 202111656065.8 are incorporated herein by reference.

TECHNICAL FIELD

The present disclosure relates to the field of semiconductor integrated circuit manufacturing technologies, and in particular, to a clock tree layout and a forming method thereof.

BACKGROUND

With the rapid development of integrated circuit technologies, the market has put forward higher requirements on integration of semiconductor products and accuracy of signal transmission. Some circuit modules integrated within an integrated circuit need clock signals to trigger corresponding functional responses. Generally, an input clock signal of the integrated circuit is divided by a divider to obtain several different divided clock signals, which are then provided to corresponding functional modules.

When a conventional divider divides the input clock signal, some divided clock signals in the obtained clock tree have large phase errors, causing it difficult to meet the requirements of the integrated circuits on accuracy of signal transmission.

SUMMARY

Embodiments of the present disclosure provide a clock tree layout and a forming method thereof.

According to some embodiments, an aspect of the present disclosure provides a clock tree layout, including: a divider module layout, a phase module layout and a wire pattern layer; wherein the divider module layout is configured to receive a first clock signal, and divide the first clock signal, and obtain a plurality of second clock sampling signals phase-associated; the phase module layout includes a first quantity of phase modules disposed in a first preset direction, the phase module is configured to generate a second clock signal based on a correspondingly connected second clock sampling signal, and the phase modules are symmetrically distributed with respect to the divider module layout; the wire pattern layer is configured to electrically connect the phase is module and a divider module in the divider module layout; and a difference between phases of any two of the second clock signals falls within a preset precision range.

According to some embodiments, another aspect of the present disclosure discloses a method of forming a clock tree layout, including: providing a divider module layout, where the divider module layout is configured to receive a first clock signal, and divide the first clock signal, and obtain a plurality of second clock sampling signals phase-associated; providing a phase module layout, wherein the phase module layout includes a first quantity of phase modules disposed in a first preset direction, the phase module is configured to generate a second clock signal based on a correspondingly connected second clock sampling signal, and the phase modules are symmetrically distributed with respect to the divider module layout; and winding the phase module layout and/or the divider module layout, and forming a wire pattern layer, wherein the wire pattern layer is configured to electrically connect a divider module in the divider module layout and a corresponding phase module, and a difference between phases of any two of the second clock signals falls within a preset precision range.

Details of one or more embodiments of the present disclosure are illustrated in the following drawings and description. Other features, objectives, and advantages of the present disclosure become evident in the specification, claims, and accompanying drawings.

BRIEF DESCRIPTION OF THE DRAWINGS

To describe the technical solutions in the embodiments of the present disclosure more clearly, the accompanying drawings required to describe the embodiments are briefly described below. Apparently, the accompanying drawings described below are only some embodiments of the present disclosure. A person of ordinary skill in the art may further obtain accompanying is drawings of other embodiments based on these accompanying drawings without creative efforts.

DETAILED DESCRIPTION

Figure 1:
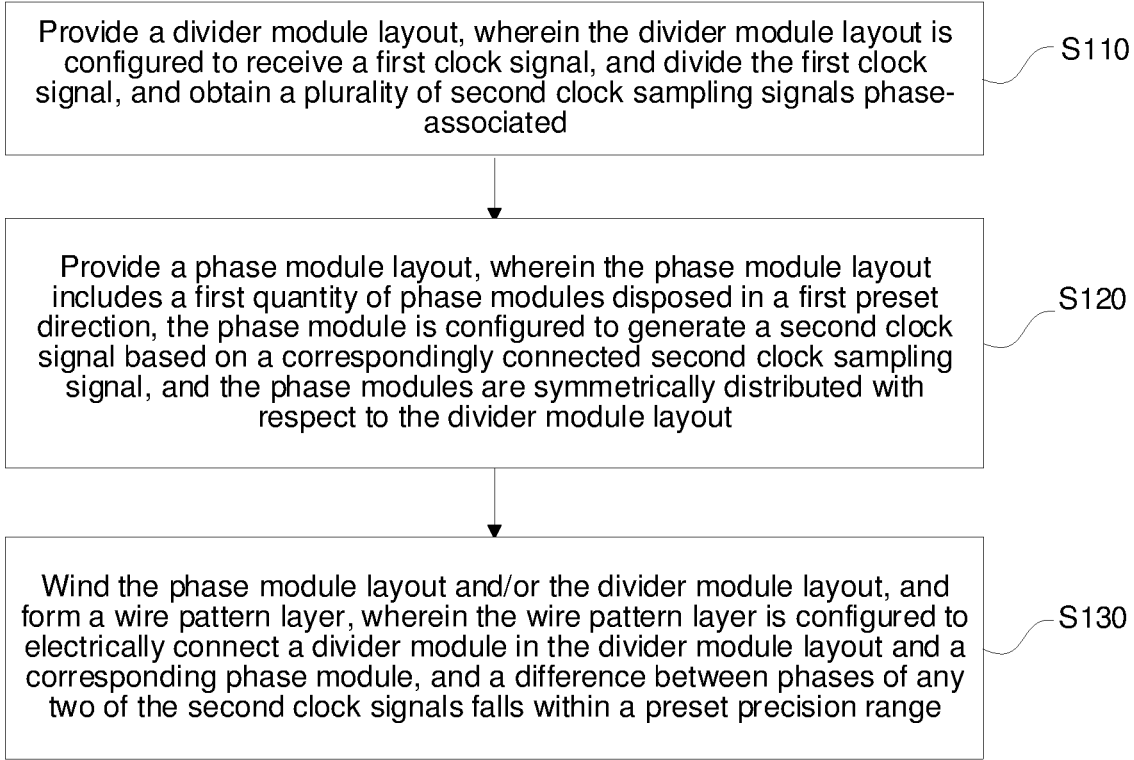
FIG. 1 to FIG. 4 are each a schematic diagram of a method of forming a clock tree layout according to an embodiment of the present disclosure.

To facilitate the understanding of the present disclosure, the present disclosure is described more completely below with reference to the related accompanying drawings. The preferred embodiments of the present disclosure are shown in the accompanying drawings. However, the present disclosure may be embodied in various forms without being limited to the embodiments described herein. On the contrary, these embodiments are provided to make the present disclosure more thorough and comprehensive.

Unless otherwise defined, all technical and scientific terms used herein have the same meaning as commonly understood by those skilled in the technical field of the present disclosure. The terms used in the specification of the present disclosure are merely for the purpose of describing specific embodiments, rather than to limit the present disclosure. The term "and/or" used herein includes any and all combinations of one or more of the associated listed items.

It should be understood that when an element or a layer is described as "being on", "being connected to" or "being coupled to" another element or layer, it can be on, connected to, or coupled to the another element or layer directly, or intervening elements or layers may be present. On the contrary, when an element is described as "being directly on", "being directly connected to" or "being directly coupled to" another element or layer, there are no intervening elements or layers. It should be understood that although terms such as first, second, and third may be used to describe various elements, components, regions, layers and/or sections, these elements, components, regions, layers and/or sections should not be limited by these terms. These terms are only used to distinguish one element, component, region, layer or section from another element, component, region, layer or section. Therefore, without departing from the teachings of the present disclosure, the first element, component, region, layer or section discussed below may be expressed as a second element, component, region, layer or section.

Spatial relationship terms such as "under", "beneath", "lower", "below", "above", and "upper" can be used herein to conveniently describe the relationship shown in the figure between one element or feature and another element or feature. It should be understood that in addition to the orientations shown in the figure, the spatial relationship terms are intended to further include different orientations of used and operated devices. For example, if a device in the accompanying drawings is turned over, a device or feature described as being "beneath another element", "below it", or "under it" is oriented "on" another element or feature. Therefore, the exemplary terms "beneath" and "under" may include two orientations of above and below. The device may be otherwise oriented (rotated by 90 degrees or other orientations), and the spatial description used herein is interpreted accordingly.

The purpose of the terms used herein is only to describe specific embodiments instead of being a limitation of the present disclosure. In this specification, the singular forms of "a", "an" and "the/this" also include plural forms, unless clearly indicated otherwise. It should also be understood that is terms "include" and/or "comprise", when used in this specification, determine the presence of features, integers, steps, operations, elements and/or components, but do not exclude the presence or addition of one or more other features, integers, steps, operations, elements, components and/or groups. In this specification, the term "and/or" includes any and all combinations of related listed items.

Refer to FIG. 1 to FIG. 8B. It should be noted that, the drawings provided in the embodiments merely illustrate the basic concepts of the present disclosure schematically. Although the drawings only show components related to the present disclosure rather than being drawn according to the quantities, shapes, and sizes of components in actual implementation, patterns, quantities, and proportions of components in actual implementation may be changed randomly, and the component layout may be more complex.

As shown in FIG. 1, an embodiment of the present disclosure provides a method of forming a clock tree layout, including:

Step S110: Provide a divider module layout, wherein the divider module layout is configured to receive a first clock signal, and divide the first clock signal, and obtain a plurality of second clock sampling signals phase-associated.

Step S120: Provide a phase module layout, wherein the phase module layout includes a first quantity of phase modules disposed in a first preset direction, the phase module is configured to generate a second clock signal based on a correspondingly connected second clock sampling signal, and the phase modules are symmetrically distributed with respect to the divider module layout.

Step S130: Wind the phase module layout and/or the divider module layout, and form a wire pattern layer, wherein the wire pattern layer is configured to electrically connect a divider module in the divider module layout and a corresponding phase module, and a difference between phases of any two of the second clock signals falls within a preset precision range.

Specifically, still referring to FIG. 1, the position relationship between the is phase modules in the phase module layout and the divider module in the divider module layout and the wire distribution in the wire pattern layer are designed to enable a difference between times of any two of the second clock signals output by the phase modules falls within a preset time precision range, to ensure consistency of the plurality of second clock signals reaching a back-end circuit after being output by the phase modules based on the second clock sampling signals provided by the divider module, avoids large phase errors among the plurality of second clock signals caused by the different clock signal transmission links, thus performing accurate phase difference control on the second clock signals input to the back-end circuit and improving the operation stability and reliability of the semiconductor integrated circuit.

Figure 2:
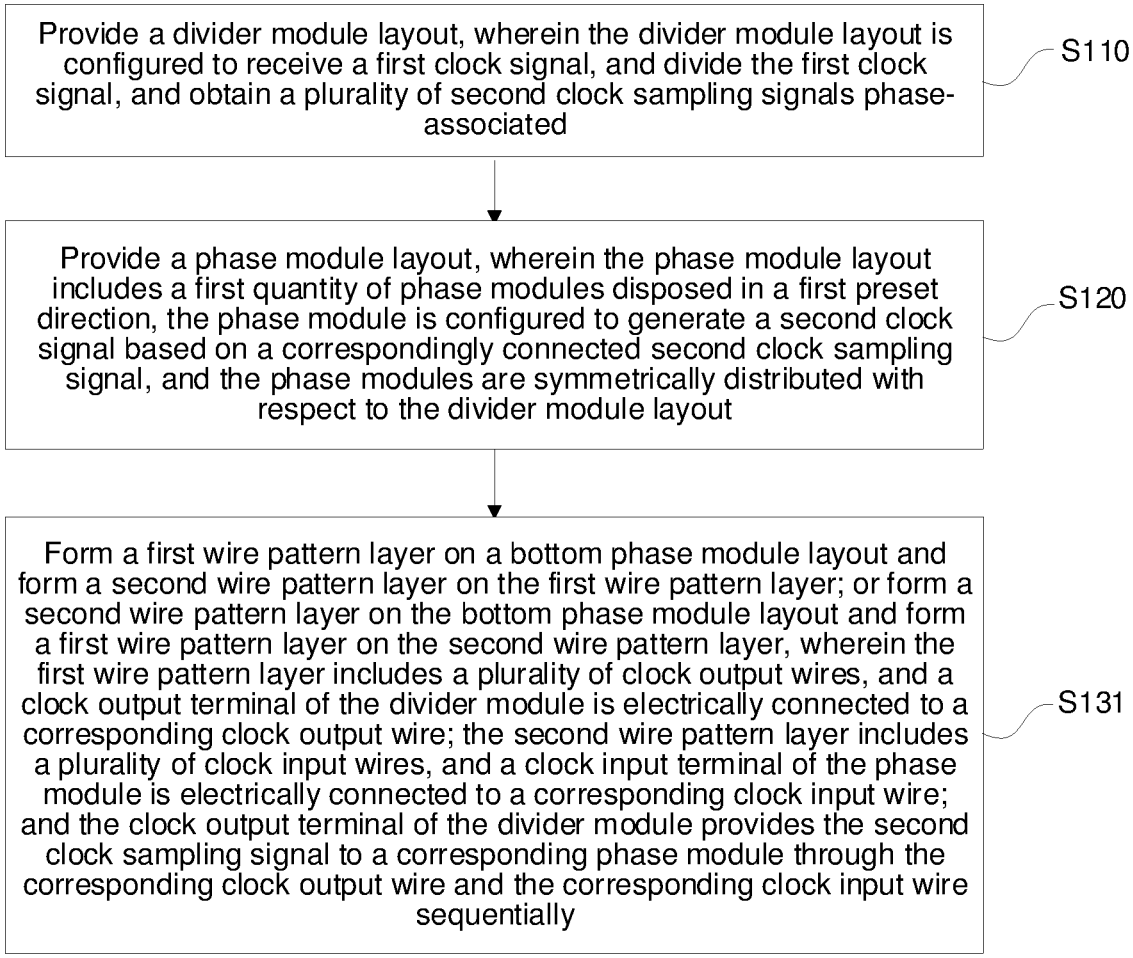

In an example, referring to FIG. 2, the wire pattern layer includes a first wire pattern layer and a second wire pattern layer and the forming a wire pattern layer in step S130 includes:

Step S131: Form the first wire pattern layer on the phase module layout, and form the second wire pattern layer on the first wire pattern layer; or form the second wire pattern layer on the phase module layout, and form the first wire pattern layer on the second wire pattern layer, wherein the first wire pattern layer includes a plurality of clock output wires, and a clock output terminal of the divider module is electrically connected to a corresponding clock output wire; the second wire pattern layer includes a plurality of clock input wires, and a clock input terminal of the phase module is electrically connected to a corresponding clock input wire; and the clock output terminal of the divider module provides the second clock sampling signal to a corresponding phase module through the corresponding clock output wire and the corresponding clock input wire sequentially.

Specifically, still referring to FIG. 2, a difference between lengths of any two of signal transmission paths between the clock output terminal of the divider module and the clock input terminal of the corresponding phase module falls within a preset length precision range, to ensure consistency of the second clock signals reaching the back-end circuit after being output by the phase modules based on the second clock sampling signals provided by the divider module, avoids large phase errors among the plurality of clock signals caused by the different clock signal transmission links, thus performing accurate phase difference control on the second clock signals input to the back-end circuit and improving the operation stability and reliability of the semiconductor integrated circuit.

Figure 3:
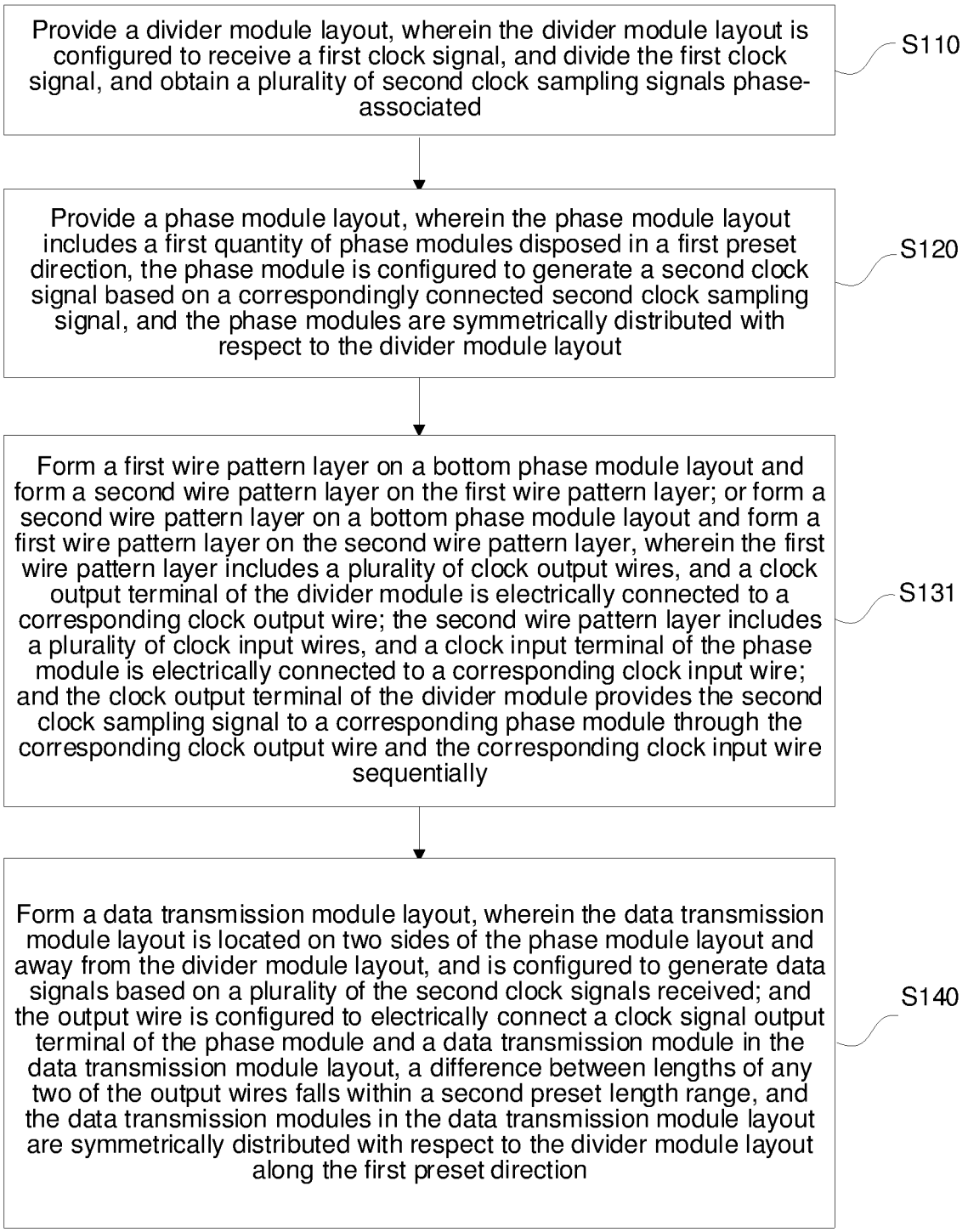

In an example, referring to FIG. 3, the wire pattern layer further includes a third wire pattern layer, the third wire pattern layer includes a plurality of output wires, and after step S130, the method further includes:

Step S140: Form a data transmission module layout, wherein the data transmission module layout is located on two sides of the phase module layout and away from the divider module layout, and is configured to generate data signals based on a plurality of the second clock signals received; and the output wire is configured to electrically connect a clock signal output terminal of the phase module and a data transmission module in the data transmission module layout, a difference between lengths of any two of the output wires falls within a second preset length range, and the data transmission modules in the data transmission module layout are symmetrically distributed with respect to the divider module layout along the first preset direction.

Specifically, still referring to FIG. 3, the data transmission modules in the data transmission module layout are symmetrically distributed with respect to the divider module layout along the first preset direction, to ensure consistency of the data transmission modules receiving the second clock signals provided by the phase modules and improve the operation stability and reliability of the semiconductor integrated circuit.

Figure 4:
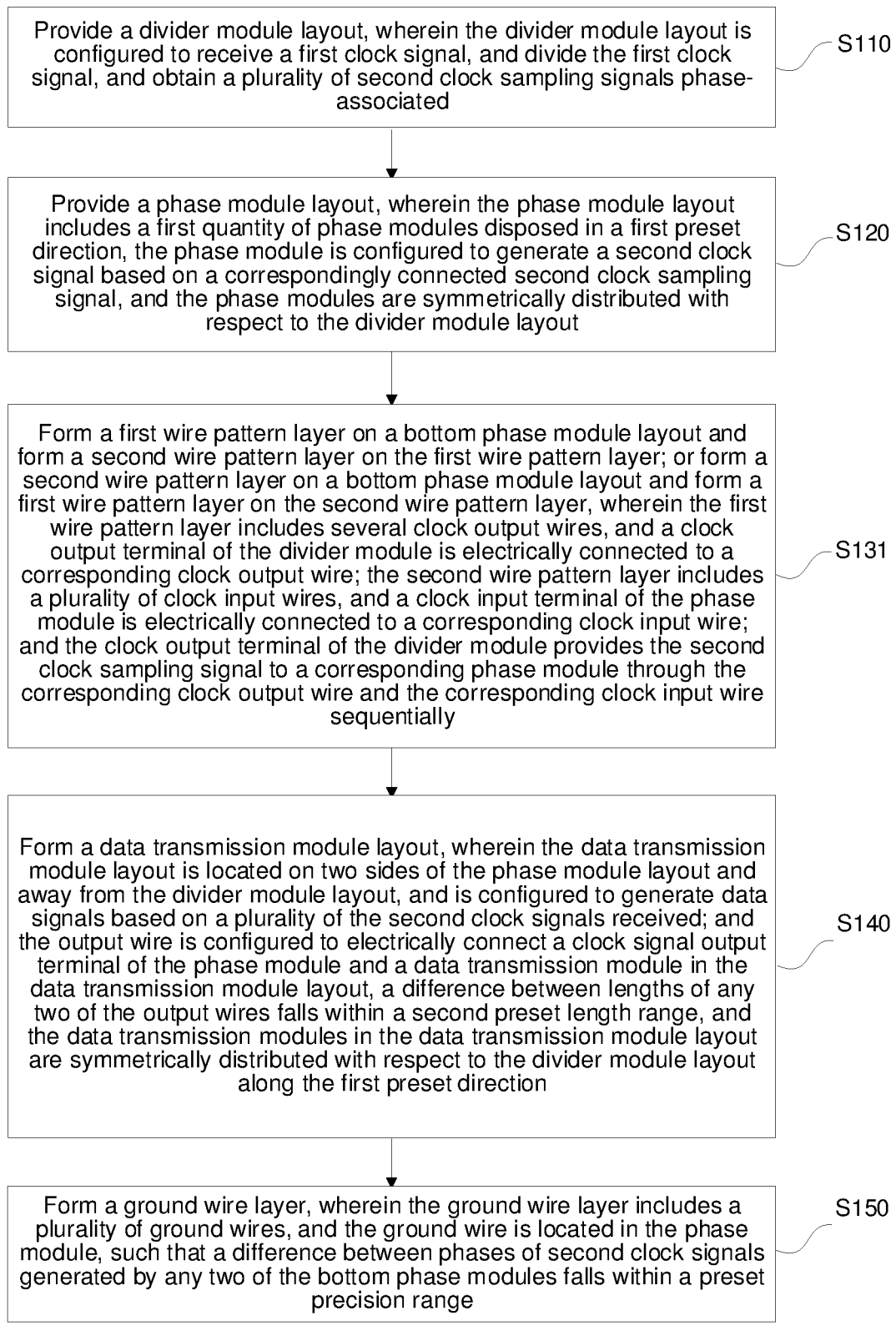

In an example, referring to FIG. 4, after the wire pattern layer is formed, the method further includes:

Step S150: Form a ground wire layer, wherein the ground wire layer includes a plurality of ground wires, and the ground wire is located in the phase is module, such that a difference between phases of second clock signals generated by any two bottom phase modules falls within the preset precision range.

Specifically, wherein the windings in the phase modules are different, the ground wire is configured to cover it, such that network environments of power signal lines in the phase modules remain consistent and the signals of the phase modules do not interfere with each other.

Figure 5:
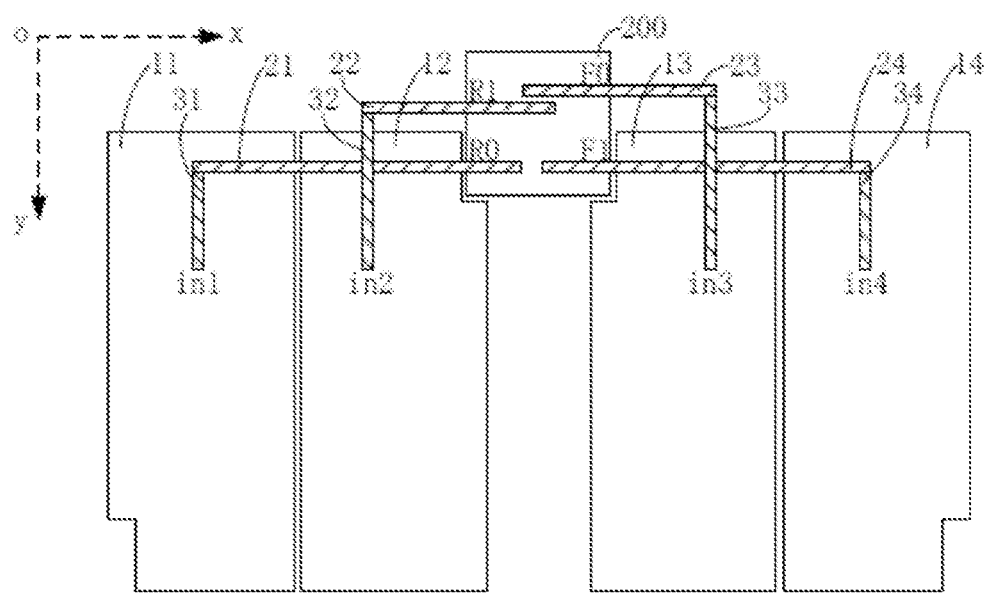
FIG. 5 to FIG. 7 are each a schematic top view of a clock tree layout according to an embodiment of the present disclosure.

In an example, referring to FIG. 5, the wire pattern layer includes a first wire, a second wire, a third wire and a fourth wire that are electrically isolated; the phase modules include a first phase module 11, a second phase module 12, a third phase module 13 and a fourth phase module 14; and the first wire is configured to electrically connect a first clock output terminal R0 of the divider module 200 and a clock input terminal in1 of the first phase module, the second wire is configured to electrically connect a second clock output terminal R1 of the divider module 200 and a clock input terminal in2 of the second phase module, the third wire is configured to electrically connect a third clock output terminal F0 of the divider module 200 and a clock input terminal in3 of the third phase module, and the fourth wire is configured to electrically connect a fourth clock output terminal F1 of the divider module 200 and a clock input terminal in4 of the fourth phase module. A difference between any two of a width of the first wire, a width of the second wire, a width of the third wire and a width of the fourth wire falls within a preset width range, and a difference between any two of a length of the first wire, a length of the second wire, a length of the third wire and a length of the fourth wire falls within a first preset length range. The second clock sampling signals include: a first clock sampling sub-signal data1 associated with a first phase, a second clock sampling sub-signal data2 associated with a second phase, a third clock sampling sub-signal data3 associated with a third phase, and a fourth clock sampling sub-signal data4 associated with a fourth phase. The first clock output terminal R0 of the divider module 200 provides the first clock sampling sub-signal data1 to the clock input terminal in1 of the first phase module 11 through the first wire, the second clock output terminal R1 of the divider module 200 provides the second clock sampling sub-signal data2 to the clock input terminal in2 of the second phase module 12 through the second wire, the third clock output terminal F0 of the divider module 200 provides the third clock sampling sub-signal data3 to the clock input terminal in3 of the third phase module 13 through the third wire, and the fourth clock output terminal F1 of the divider module 200 provides the fourth clock sampling sub-signal data4 to the clock input terminal in4 of the fourth phase module 14 through the fourth wire. The second clock signals include: a first clock sub-signal signal1 associated with the first phase, a second clock sub-signal signal2 associated with the second phase, a third clock sub-signal signal3 associated with the third phase, and a fourth clock sub-signal signal4 associated with the fourth phase. The first phase module 11 generates the first clock sub-signal signal1 based on the correspondingly connected first clock sampling sub-signal data1, the second phase module 12 generates the second clock sub-signal signal2 based on the correspondingly connected second clock sampling sub-signal data2, the third phase module 13 generates the third clock sub-signal signal3 based on the correspondingly connected third clock sampling sub-signal data3, and the fourth phase module 14 generates the fourth clock sub-signal signal4 based on the correspondingly connected fourth clock sampling sub-signal data4. A difference between any two of a phase of the first clock sub-signal signal1, a phase of the second clock sub-signal signal2, a phase of the third clock sub-signal signal3 and a phase of the fourth clock sub-signal signal4 falls within the preset precision range. This embodiment ensures consistency of the plurality of second clock signals reaching the back-end circuit after being generated by the phase modules based on the plurality of second clock sampling signals provided by the divider module, avoids large phase errors among the plurality of clock signals caused by the different clock signal transmission links, thus performing accurate phase difference control on the second clock signals input to the back-end circuit and improving the operation stability and reliability of the semiconductor integrated circuit.

In an example, still referring to FIG. 5, the clock output wires include a first clock output wire 21, a second clock output wire 22, a third clock output wire 23 and a fourth clock output wire 24. The clock input wires include a first clock input wire 31, a second clock input wire 32, a third clock input wire 33 and a fourth clock input wire 34. The first clock output wire 21 and the first clock input wire 31 form the first wire, the second clock output wire 22 and the second clock input wire 32 form the second wire, the third clock output wire 23 and the third clock input wire 33 form the third wire, and the fourth clock output wire 24 and the fourth clock input wire 34 form the fourth wire. In this way, through a symmetrical relationship between at least two of the first clock input wire 31, the second clock input wire 32, the third clock input wire 33 and the fourth clock input wire 34, and/or a symmetrical relationship between at least two of the first clock output wire 21, the second clock output wire 22, the third clock output wire 23 and the fourth clock output wire 24, a difference between times of any two phase modules receiving the second clock sampling signals provided by the divider module 200 is controlled to fall within the preset time precision range, to ensure consistency of the plurality of second clock signals reaching the back-end circuit after being generated by the phase modules based on the plurality of second clock sampling signals provided by the divider module 200, and reduce the structure complexity of the clock tree layout and the complexity of the manufacturing process.

In an example, still referring to FIG. 5, the first phase module 11 and the fourth phase module 14 are symmetrically distributed with respect to the divider module layout 200 along the first preset direction ox, and the second phase module 12 and the third phase module 13 are symmetrically distributed with respect to the divider module layout 200 along the first preset direction ox. The first clock input wire 31 and the fourth clock input wire 34 are symmetrically distributed with respect to the divider module layout 200 along the first preset direction ox. This ensures consistency of the plurality of second clock signals is reaching the back-end circuit after being generated by the phase modules based on the plurality of second clock sampling signals provided by the divider module 200, reduces a length of the signal transmission path between the clock output terminal of the divider module 200 and the clock input terminal of the corresponding phase module, and reduces the structure complexity of the clock tree layout and the complexity of the manufacturing process.

Figure 6:
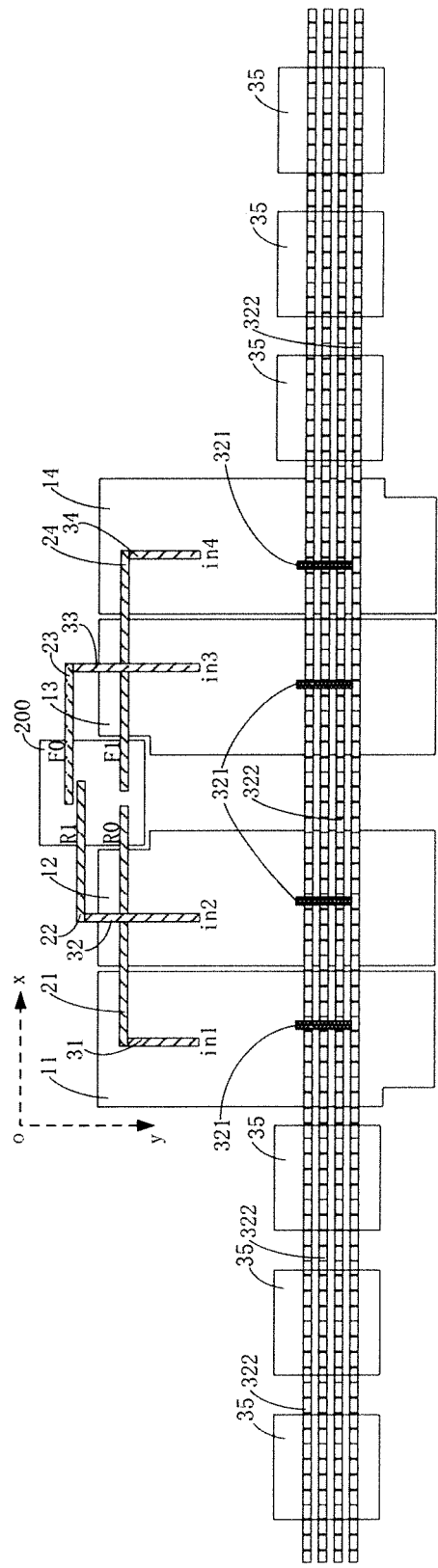

In an example, referring to FIG. 6, the clock tree layout further includes a data transmission module layout. The data transmission module layout is located on two sides of the phase module layout and away from the divider module layout, and is configured to generate data signals based on a plurality of the second clock signals received. The wire pattern layer further includes a third wire pattern layer; the third wire pattern layer includes a plurality of output wires, the output wire is configured to electrically connect a clock signal output terminal of the phase module and a data transmission module 35 in the data transmission module layout, and a difference between lengths of any two of the output wires falls within a second preset length range. The data transmission modules 35 in the data transmission module layout may be symmetrically distributed with respect to the divider module layout 200 along the first preset direction ox. This ensures consistency of the data transmission modules 35 receiving the second clock signals provided by the phase modules, and improves the operation stability and reliability of the semiconductor integrated circuit.

In an example, still referring to FIG. 6, the output wires include first output wires 321 extending along a second preset direction oy and second output wires 322 extending along the first preset direction ox. Lengths of the first output wires 321 are equal, and the second preset direction oy is perpendicular to the first preset direction ox. This embodiment ensures consistency of the data transmission modules 35 receiving the second clock signals provided by bottom phase modules, and improves the operation stability and reliability of the semiconductor integrated circuit.

In an example, still referring to FIG. 6, at least one of the second output wires 322 is provided with a compensation resistor (not shown); and a resistance of the compensation resistor is inversely proportional to a first distance, wherein the first distance is a distance between the phase module and the corresponding data transmission module in the first preset direction ox. This ensures consistency of the data transmission modules 35 receiving the second clock signals provided by bottom phase modules, and improves the operation stability and reliability of the semiconductor integrated circuit.

Figure 7:
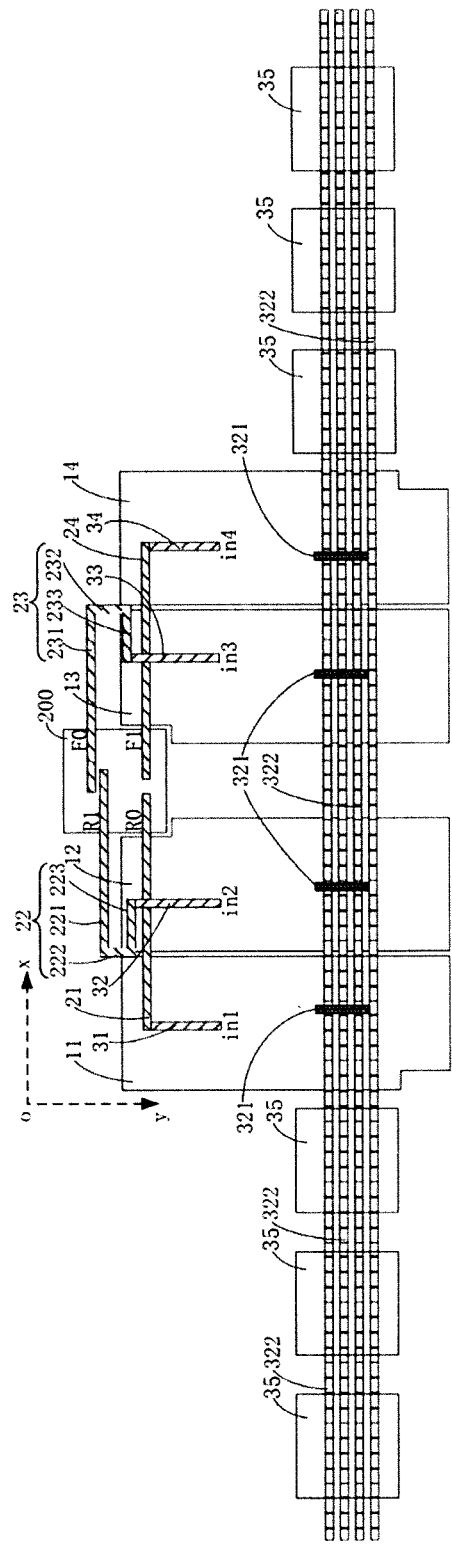

In an example, referring to FIG. 7, the second clock output wire 22 includes a first clock output sub-wire 221 and a second clock output sub-wire 222 that are mutually perpendicular, and a third clock output sub-wire 223 perpendicular to the second clock output sub-wire 222. The second clock output terminal R1 of the divider module 200 is connected to the clock input terminal in2 of the second phase module 12 through the first clock output sub-wire 221, the second clock output sub-wire 222, the third clock output sub-wire 223 and the second clock input wire 32 sequentially. The first clock output sub-wire 221 and the third clock output sub-wire 223 extend in the first preset direction ox, and the second clock output sub-wire 222 extends in the second preset direction oy. The third clock output wire 23 includes a fourth clock output sub-wire 231 and a fifth clock output sub-wire 232 that are mutually perpendicular, and a sixth clock output sub-wire 233 perpendicular to the fifth clock output sub-wire 232. The third clock output terminal F0 of the divider module 200 is connected to the clock input terminal in3 of the third phase module through the fourth clock output sub-wire 231, the fifth clock output sub-wire 232, the sixth clock output sub-wire 233 and the third clock input wire 33 sequentially. The fourth clock output sub-wire 231 and the sixth clock output sub-wire 233 extend in the first preset direction ox, and the fifth clock output sub-wire 232 extends in the second preset direction oy. This ensures consistency of the plurality of second clock signals reaching the back-end circuit after being output by the phase modules based on the plurality of second clock sampling signals provided by is the divider module 200, reduces a length of the signal transmission path between the clock output terminal of the divider module and the clock input terminal of the corresponding phase module, and reduces the structure complexity of the clock tree layout and the complexity of the manufacturing process.

In an example, still referring to FIG. 7, the first clock output sub-wire 221 and the fourth clock output sub-wire 231 are central symmetrically distributed; and the length of the second clock output sub-wire 222 is less than the length of the fifth clock output sub-wire 232. This ensures consistency of the plurality of second clock signals reaching the back-end circuit after being output by the phase modules based on the plurality of second clock sampling signals provided by the divider module 200, reduces a length of the signal transmission path between the clock output terminal of the divider module and the clock input terminal of the corresponding phase module, and reduces the structure complexity of the clock tree layout and the complexity of the manufacturing process.

In an example, still referring to FIG. 7, the clock output wires are located in the first wire pattern layer, the clock input wires are located in the second wire pattern layer, to facilitate electrical isolation among the wires in different layers, thereby avoiding a short circuit in the part at which the wires overlap each other. The material of the clock output wire may be different from the material of the clock input wire, to avoid crosstalk between signals transmitted by different layers.

In an example, still referring to FIG. 7, the material used to prepare the first clock output wire 21, the second clock output wire 22, the third clock output wire 23 and the fourth clock output wire 24 is different from the material used to prepare the first clock input wire 31, the second clock input wire 32, the third clock input wire 33 and the fourth clock input wire 34. For example, the first clock output wire 21, the second clock output wire 22, the third clock output wire 23 and the fourth clock output wire 24 are made of copper, and the first clock is input wire 31, the second clock input wire 32, the third clock input wire 33 and the fourth clock input wire 34 are made of tungsten, to avoid signal crosstalk between the first clock output wire 21 and the second clock input wire 32, and avoid signal crosstalk between the fourth clock output wire 24 and the third clock input wire 33.

The present disclosure provides a clock tree layout, including the divider module layout, the phase module layout and the wire pattern layer. The divider module layout is configured to receive the first clock signal, and divide the first clock signal, and obtain the plurality of second clock sampling signals phase-associated; the phase module layout includes the first quantity of phase modules disposed in the first preset direction, the phase module is configured to generate the second clock signal based on the correspondingly connected second clock sampling signal, and the phase modules are symmetrically distributed with respect to the divider module layout; the wire pattern layer is configured to electrically connect the phase module to the divider module in the divider module layout; and the difference between phases of any two of the second clock signals falls within the preset precision range. This ensures consistency of the plurality of second clock signals reaching the back-end circuit after being output by the phase modules based on the second clock sampling signals provided by the divider module, avoids large phase errors among the plurality of clock signals caused by the different clock signal transmission links, thus performing accurate phase difference control on the second clock signals input to the back-end circuit and improving the operation stability and reliability of the semiconductor integrated circuit.

In an example, referring to FIG. 5, the wire pattern layer includes a first wire pattern layer and a second wire pattern layer; the first wire pattern layer includes a plurality of clock output wires that are isolated from each other, and a clock output terminal of the divider module 200 is electrically connected to a corresponding clock output wire; the second wire pattern layer includes a plurality of clock input wires that are isolated from each other, and a clock input is terminal of the phase module is electrically connected to a corresponding clock input wire; and the clock output terminal of the divider module 200 provides the second clock sampling signal to a corresponding phase module through the corresponding clock output wire and the corresponding clock input wire sequentially. A difference between lengths of any two of signal transmission paths between the clock output terminal of the divider module 200 and the clock input terminal of the corresponding phase module may fall within a preset length precision range, to ensure consistency of the second clock signals reaching the back-end circuit after being output by the phase modules based on the second clock sampling signals provided by the divider module 200, avoids large phase errors among the plurality of clock signals caused by the different clock signal transmission links, thus performing accurate phase difference control on the second clock signals input to the back-end circuit and improving the operation stability and reliability of the semiconductor integrated circuit.

In an example, still referring to FIG. 5, the wire pattern layer includes a first wire, a second wire, a third wire and a fourth wire that are electrically isolated; and the phase modules include a first phase module 11, a second phase module 12, a third phase module 13 and a fourth phase module 14. The first wire is configured to electrically connect a first clock output terminal R0 of the divider module 200 and a clock input terminal in1 of the first phase module 11, the second wire is configured to electrically connect a second clock output terminal R1 of the divider module 200 and a clock input terminal in2 of the second phase module 12, the third wire is configured to electrically connect a third clock output terminal F0 of the divider module 200 and a clock input terminal in3 of the third phase module 13, and the fourth wire is configured to electrically connect a fourth clock output terminal F1 of the divider module 200 and a clock input terminal in4 of the fourth phase module 14. A difference between any two of a width of the first wire, a width of the second wire, a width of the third wire and a width of the fourth wire falls within the preset width range, and a difference between any two of a length of the first wire, a length of the second wire, a length of the third wire and a length of the fourth wire falls within a preset length range, to ensure consistency of the second clock signals reaching the back-end circuit after being output by the phase modules based on the second clock sampling signals provided by the divider module 200, avoids large phase errors among the plurality of clock signals caused by the different clock signal transmission links, thus performing accurate phase difference control on the second clock signals input to the back-end circuit and improving the operation stability and reliability of the semiconductor integrated circuit.

In an example, still referring to FIG. 5, the clock output wires include a first clock output wire 21, a second clock output wire 22, a third clock output wire 23 and a fourth clock output wire 24. The clock input wires include a first clock input wire 31, a second clock input wire 32, a third clock input wire 33 and a fourth clock input wire 34. The first clock output wire 21 and the first clock input wire 31 form the first wire, the second clock output wire 22 and the second clock input wire 32 form the second wire, the third clock output wire 23 and the third clock input wire 33 form the third wire, and the fourth clock output wire 24 and the fourth clock input wire 34 form the fourth wire. In this way, through a symmetrical relationship between at least two of the first clock input wire 31, the second clock input wire 32, the third clock input wire 33 and fourth clock input wire 34, and/or a symmetrical relationship between at least two of the first clock output wire 21, the second clock output wire 22, the third clock output wire 23 and the fourth clock output wire 24, a difference between times of any two phase modules receiving the second clock sampling signals provided by the divider module 200 is controlled to fall within the preset time precision range. The first phase module 11 and the fourth phase module 14 are symmetrically distributed with respect to the divider module layout 200 along the first preset direction ox, and the second phase module 12 and the third phase module 13 are symmetrically distributed with respect to the divider module layout 200 along the first preset direction ox. The first clock input wire 31 and the fourth clock input wire 34 are symmetrically distributed with respect to the divider module layout 200 along the first preset direction ox. This ensures consistency of the plurality of second clock sampling signals provided by the divider module 200 reaching the back-end circuit through the phase modules, and reduces the structure complexity of the clock tree layout and the complexity of the manufacturing process. This further reduces a length of the signal transmission path between the clock output terminal of the divider module 200 and the clock input terminal of the corresponding phase module, and reduces the structure complexity of the clock tree layout and the complexity of the manufacturing process.

In an example, referring to FIG. 6, the clock tree layout further includes a data transmission module layout. The data transmission module layout is located on two sides of the phase module layout and away from the divider module layout, and is configured to generate data signals based on a plurality of the second clock signals received. The wire pattern layer further includes a third wire pattern layer; the third wire pattern layer includes a plurality of output wires, the output wire is configured to electrically connect a clock signal output terminal of the phase module and a data transmission module 35 in the data transmission module layout, and a difference between lengths of any two of the output wires falls within a second preset length range. The data transmission modules 35 in the data transmission module layout may be symmetrically distributed with respect to the divider module layout 200 along the first preset direction ox. This ensures consistency of the data transmission modules 35 receiving the second clock signals provided by the phase modules, and improves the operation stability and reliability of the semiconductor integrated circuit.

In an example, referring to FIG. 7, the second clock output wire 22 includes a first clock output sub-wire 221 and a second clock output sub-wire 222 that are mutually perpendicular, and a third clock output sub-wire 223 perpendicular to the second clock output sub-wire 222. The second clock output terminal R1 of the divider module 200 is connected to the clock input terminal in2 of the second phase module 12 through the first clock output sub-wire 221, the second clock output sub-wire 222, the third clock output sub-wire 223 and the second clock input wire 32 sequentially. The first clock output sub-wire 221 and the third clock output sub-wire 223 extend in the first preset direction ox, and the second clock output sub-wire 222 extends in the second preset direction oy. The third clock output wire 23 includes a fourth clock output sub-wire 231 and a fifth clock output sub-wire 232 that are mutually perpendicular, and a sixth clock output sub-wire 233 perpendicular to the fifth clock output sub-wire 232. The third clock output terminal F0 of the divider module 200 is connected to the clock input terminal in3 of the third phase module through the fourth clock output sub-wire 231, the fifth clock output sub-wire 232, the sixth clock output sub-wire 233 and the third clock input wire 33 sequentially. The fourth clock output sub-wire 231 and the sixth clock output sub-wire 233 extend in the first preset direction ox, and the fifth clock output sub-wire 232 extends in the second preset direction oy. The first clock output sub-wire 221 and the fourth clock output sub-wire 231 may be central symmetrically distributed; and the length of the second clock output sub-wire 222 may be less than the length of the fifth clock output sub-wire 232. This ensures consistency of the plurality of second clock signals reaching the back-end circuit after being output by the phase modules based on the plurality of second clock sampling signals provided by the divider module 200, reduces a length of the signal transmission path between the clock output terminal of the divider module and the clock input terminal of the corresponding phase module, and reduces the structure complexity of the clock tree layout and the complexity of the manufacturing process.

Figure 8A:
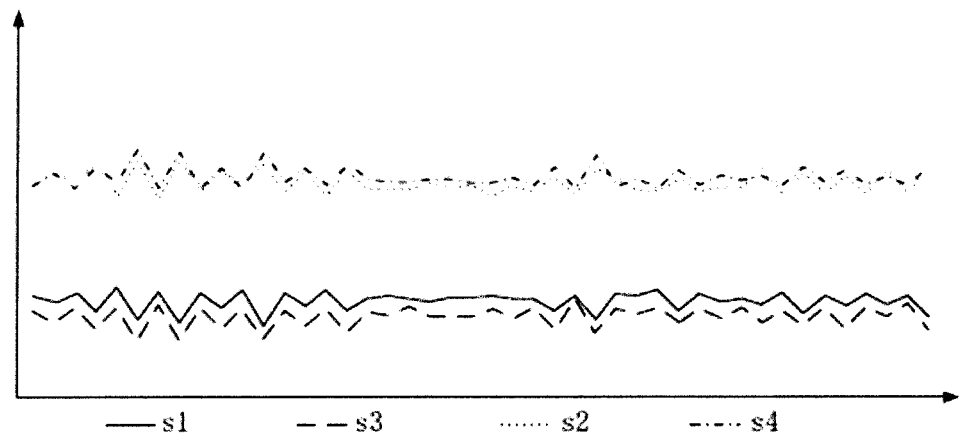
FIG. 8A is a waveform curve of sampling time sequences of four divided clock signals provided by phase modules according to a conventional embodiment.
Figure 8B:
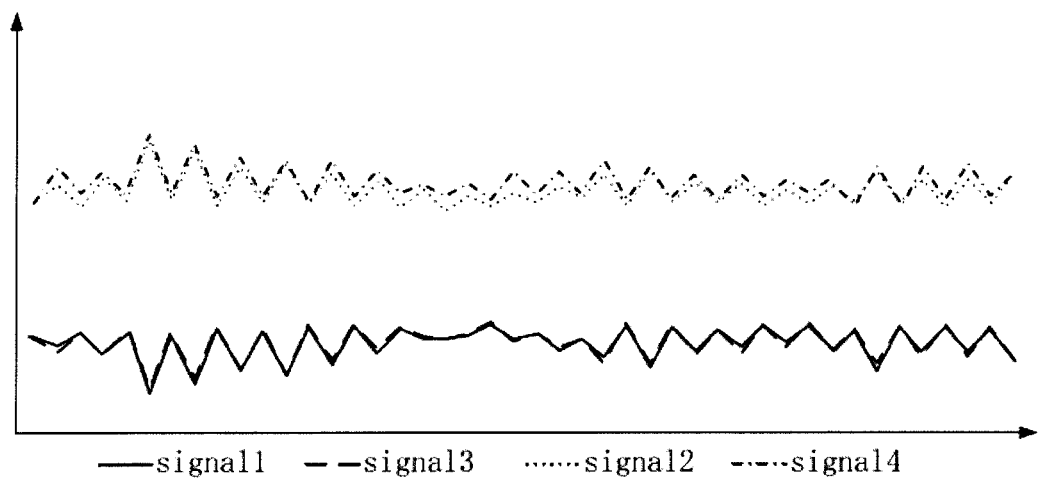
FIG. 8B is a waveform curve of sampling time sequences of four second clock signals provided by phase modules to a back-end circuit according to an embodiment of the present disclosure.

In an example, referring to FIG. 8A and FIG. 8B, the first phase may be set to 0 degrees, the second phase to 90 degrees, the third phase to 180 degrees, and the fourth phase to 270 degrees. FIG. 8A shows waveform curves of the sampling amplitude sequences, changing over time, of a first divided clock signal s1 associated with the first phase, a second divided clock signal s2 associated with the second phase, a third divided clock signal s3 associated with the third phase and a fourth divided clock signal s4 associated with the fourth phase which are provided by the phase modules to the back-end circuit according to a conventional embodiment. FIG. 8B shows waveform curves of sampling amplitude sequences, changing over time, of the first clock sub-signal signal1, the second clock sub-signal signal2, the third clock sub-signal signal3 and the fourth clock sub-signal signal4 output by the phase modules based on the second clock sampling signals provided by the divider module. By comparing FIG. 8A with FIG. 8B, it can be easily learned that the consistency between the first clock sub-signal signal1 associated with 0 degrees and the third clock sub-signal signal3 associated with 180 degrees obtained in the present disclosure is better, and the consistency between the second clock sub-signal signal2 associated with 90 degrees and the fourth clock sub-signal signal4 associated with 270 degrees is better.

In an example, the clock tree layout further includes a ground wire layer, the ground wire layer includes a plurality of ground wires, and the ground wire is located in the phase module, such that a difference between phases of second clock signals generated by any two of the phase modules falls within the preset precision range. The ground wire is configured to ensure network environments of power signal lines in the phase modules to remain consistent, thereby reducing the complexity of technical implementation and meeting the structural requirements of different application scenarios. For example, wherein the windings in the phase modules are different, the ground wire is configured to cover it and the ground wire is high-layer wire, such that network environments of power signal lines in the phase modules remain consistent and the signals of the phase modules do not interfere with each other.

It should be understood that the execution order of the steps is not strictly limited, and the steps may be executed in other orders, unless clearly described otherwise. Moreover, at least some of the steps may include a plurality of sub-steps or stages. The sub-steps or stages are not necessarily executed at the same time, but may be executed at different times. The execution order of the sub-steps or stages is not necessarily carried out sequentially, but may be executed alternately with other steps or at least some of the sub-steps or stages of other steps.

The embodiments of this specification are described in a progressive manner, and each embodiment focuses on differences from other embodiments. The same or similar parts between the embodiments may refer to each other.

The technical characteristics of the above embodiments can be employed in arbitrary combinations. In an effort to provide a concise description of these embodiments, all possible combinations of all technical characteristics of the embodiments may not be described; however, these combinations of technical characteristics should be construed as disclosed in the description as long as no contradiction occurs.

The above embodiments are only intended to illustrate a plurality of implementations of the present disclosure in detail, and they should not be construed as a limitation to the patentable scope of the present disclosure. It should be noted that those of ordinary skill in the art can further make variations and improvements without departing from the conception of the present disclosure. These variations and improvements all fall within the protection scope of the present disclosure. Therefore, the protection scope of the present disclosure should be subject to the protection scope defined by the claims.

The invention claimed is:

1. A layout structure of clock tree circuitry, comprising: a divider module, a phase module and a wire pattern layer, wherein the divider module is configured to receive a first clock signal, and divide the first clock signal, and obtain a plurality of second clock sampling signals phase-associated;

the phase module comprises a first quantity of phase modules disposed in a first preset direction, the phase module is configured to generate a second clock signal based on a correspondingly connected second clock sampling signal, and the phase modules are symmetrically distributed with respect to the divider module;

the wire pattern layer is configured to electrically connect the phase module and a divider module in the divider module; and a difference between phases of any two of the second clock signals falls within a preset precision range.

2. The layout structure of clock tree circuitry according to claim 1, wherein the wire pattern layer comprises a first wire pattern layer and a second wire pattern layer;

the first wire pattern layer comprises a plurality of clock output wires, and a clock output terminal of the divider module is electrically connected to a corresponding clock output wire;

the second wire pattern layer comprises a plurality of clock input wires, and a clock input terminal of the phase module is electrically connected to a corresponding clock input wire; and the clock output terminal of the divider module provides the second clock sampling signal to a corresponding phase module through the corresponding clock output wire and the corresponding clock input wire sequentially.

3. The layout structure of clock tree circuitry according to claim 2, wherein the wire pattern layer comprises a first wire, a second wire, a third wire and a fourth wire;

the plurality of second clock sampling signals phase-associated comprise: a first clock sampling sub-signal associated with a first phase, a second clock sampling sub-signal associated with a second phase, a third clock sampling sub-signal associated with a third phase, and a fourth clock sampling sub-signal associated with a fourth phase;

the second clock signals comprise: a first clock sub-signal associated with the first phase, a second clock sub-signal associated with the second phase, a third clock sub-signal associated with the third phase, and a fourth clock sub-signal associated with the fourth phase;

the phase modules comprise: a first phase module, a second phase module, a third phase module, and a fourth phase module;

the first wire is configured to electrically connect a first clock output terminal of the divider module and a clock input terminal of the first phase module, the second wire is configured to electrically connect a second clock output terminal of the divider module and a clock input terminal of the second phase module, the third wire is configured to electrically connect a third clock output terminal of the divider module and a clock input terminal of the third phase module, and the fourth wire is configured to electrically connect a fourth clock output terminal of the divider module and a clock input terminal of the fourth phase module; and a difference between any two of a width of the first wire, a width of the second wire, a width of the third wire and a width of the fourth wire falls within a preset width range, and a difference between any two of a length of the first wire, a length of the second wire, a length of the third wire and a length of the fourth wire falls within a first preset length range, such that a difference between any two of a phase of the first clock sampling sub-signal, a phase of the second clock sampling sub-signal, a phase of the third clock sampling sub-signal and a phase of the fourth clock sampling sub-signal falls within the preset precision range.

4. The layout structure of clock tree circuitry according to claim 3, wherein the first phase is 0 degrees;
the second phase is 90 degrees;
the third phase is 180 degrees; and
the fourth phase is 270 degrees.

5. The layout structure of clock tree circuitry according to claim 3, wherein the clock output wires comprise a first clock output wire, a second clock output wire, a third clock output wire and a fourth clock output wire;

the clock input wires comprise a first clock input wire, a second clock input wire, a third clock input wire and a fourth clock input wire;

the first clock output wire and the first clock input wire form the first wire, the second clock output wire and the second clock input wire form the second wire, the third clock output wire and the third clock input wire form the third wire, and the fourth clock output wire and the fourth clock input wire form the fourth wire;

the first phase module and the fourth phase module are symmetrically distributed with respect to the divider module along the first preset direction; and the second phase module and the third phase module are symmetrically distributed with respect to the divider module along the first preset direction.

6. The layout structure of clock tree circuitry according to claim 2, wherein the clock output wire comprises a plurality of clock output sub-wires mutually perpendicular, and the clock output terminal of the divider module is connected to the clock input terminal of the corresponding phase module through the plurality of clock output sub-wires and the clock input wire sequentially;

lengths of the clock output wires are equal; and/or
lengths of the clock input wires are equal.

7. The layout structure of clock tree circuitry according to claim 1, further comprising:

a data transmission module, located on two sides of the phase module and away from the divider module, and configured to generate data signals based on a plurality of the second clock signals received, wherein the wire pattern layer further comprises a third wire pattern layer;

the third wire pattern layer comprises a plurality of output wires, the output wire is configured to electrically connect a clock signal output terminal of the phase module and a data transmission module in the data transmission module, a difference between lengths of any two of the output wires falls within a second preset length range, and the data transmission modules in the data transmission module are symmetrically distributed with respect to the divider module along the first preset direction.

8. The layout structure of clock tree circuitry according to claim 7, wherein the output wires comprise first output wires extending along a second preset direction and second output wires extending along the first preset direction, lengths of the first output wires are equal, and the second preset direction is perpendicular to the first preset direction.

9. The layout structure of clock tree circuitry according to claim 8, wherein at least one of the second output wires is provided with a compensation resistor; and a resistance of the compensation resistor is inversely proportional to a first distance, and the first distance is a distance between the phase module and a corresponding data transmission module in the first preset direction.

10. The layout structure of clock tree circuitry according to claim 1, further comprising a ground wire layer, wherein the ground wire layer comprises a plurality of ground wires, and the ground wire is located in the phase module, such that a difference between phases of second clock signals generated by any two of the phase modules falls within the preset precision range.

11. A method of forming a clock tree layout, comprising:
arranging a divider module layout, wherein the divider module layout is configured to receive a first clock signal, and divide the first clock signal, and obtain a plurality of second clock sampling signals phase-associated;
arranging a phase module layout, wherein the phase module layout comprises a first quantity of phase modules disposed in a first preset direction, the phase module is configured to generate a second clock signal based on a correspondingly connected second clock sampling signal, and the phase modules are symmetrically distributed with respect to the divider module layout; and
arranging wires on the phase module layout and/or the divider module layout, and forming a wire pattern layer, wherein the wire pattern layer is configured to electrically connect a divider module in the divider module layout and a corresponding phase module, and a difference between phases of any two of the second clock signals falls within a preset precision range.

12. The method of forming a clock tree layout according to claim 11, wherein the wire pattern layer comprises a first wire pattern layer and a second wire pattern layer, and the forming a wire pattern layer comprises:
forming the first wire pattern layer on the phase module layout, and forming the second wire pattern layer on the first wire pattern layer; or
forming the second wire pattern layer on the phase module layout, and forming the first wire pattern layer on the second wire pattern layer, wherein
the first wire pattern layer comprises a plurality of clock output wires, and a clock output terminal of the divider module is electrically connected to a corresponding clock output wire; the second wire pattern layer comprises a plurality of clock input wires, and a clock input terminal of the phase module is electrically connected to a corresponding clock input wire; and the clock output terminal of the divider module provides the second clock sampling signal to a corresponding phase module through the corresponding clock output wire and the corresponding clock input wire sequentially.

13. The method of forming a clock tree layout according to claim 12, wherein the wire pattern layer comprises a first wire, a second wire, a third wire and a fourth wire;
the plurality of second clock sampling signals phase-associated comprise: a first clock sampling sub-signal associated with a first phase, a second clock sampling sub-signal associated with a second phase, a third clock sampling sub-signal associated with a third phase, and a fourth clock sampling sub-signal associated with a fourth phase;
the second clock signals comprise: a first clock sub-signal associated with the first phase, a second clock sub-signal associated with the second phase, a third clock sub-signal associated with the third phase, and a fourth clock sub-signal associated with the fourth phase;
the phase modules comprise: a first phase module, a second phase module, a third phase module, and a fourth phase module;
the first wire is configured to electrically connect a first clock output terminal of the divider module and a clock input terminal of the first phase module, the second wire is configured to electrically connect a second clock output terminal of the divider module and a clock input terminal of the second phase module, the third wire is configured to electrically connect a third clock output terminal of the divider module and a clock input terminal of the third phase module, and the fourth wire is configured to electrically connect a fourth clock output terminal of the divider module and a clock input terminal of the fourth phase module; and
a difference between any two of a width of the first wire, a width of the second wire, a width of the third wire and a width of the fourth wire falls within a preset width range, and a difference between any two of a length of the first wire, a length of the second wire, a length of the third wire and a length of the fourth wire falls within a first preset length range, such that a difference between any two of a phase of the first clock sampling sub-signal, a phase of the second clock sampling sub-signal, a phase of the third clock sampling sub-signal and a phase of the fourth clock sampling sub-signal falls within the preset precision range.

14. The method of forming a clock tree layout according to claim 13, wherein the clock output wires comprise a first clock output wire, a second clock output wire, a third clock output wire and a fourth clock output wire;
the clock input wires comprise a first clock input wire, a second clock input wire, a third clock input wire and a fourth clock input wire; and
the first clock output wire and the first clock input wire form the first wire, the second clock output wire and the second clock input wire form the second wire, the third clock output wire and the third clock input wire form the third wire, and the fourth clock output wire and the fourth clock input wire form the fourth wire.

15. The method of forming a clock tree layout according to claim 14, wherein
the clock output wires comprise the first clock output wire, the second clock output wire, the third clock output wire and the fourth clock output wire;
the clock input wires comprise the first clock input wire, the second clock input wire, the third clock input wire and the fourth clock input wire;
the first clock output wire and the first clock input wire form the first wire, the second clock output wire and the second clock input wire form the second wire, the third clock output wire and the third clock input wire form the third wire, and the fourth clock output wire and the fourth clock input wire form the fourth wire;
the first phase module and the fourth phase module are symmetrically distributed with respect to the divider module layout along the first preset direction; and
the second phase module and the third phase module are symmetrically distributed with respect to the divider module layout along the first preset direction.

16. The method of forming a clock tree layout according to claim 15, wherein
the clock output wire comprises a plurality of clock output sub-wires mutually perpendicular, and the clock output terminal of the divider module is connected to the clock input terminal of the corresponding phase module through the plurality of clock output sub-wires and the clock input wire sequentially;
lengths of the clock output wires are equal; and/or
lengths of the clock input wires are equal.

17. The method of forming a clock tree layout according to claim 14, wherein the clock output wire comprises a plurality of clock output sub-wires mutually perpendicular, and the clock output terminal of the divider module is connected to the clock input terminal of the corresponding phase module through the plurality of clock output sub-wires and the clock input wire sequentially;

lengths of the clock output wires are equal; and/or lengths of the clock input wires are equal.

18. The method of forming a clock tree layout according to claim 11, wherein the wire pattern layer further comprises a third wire pattern layer, the third wire pattern layer comprises a plurality of output wires, and the method further comprises:

forming a data transmission module layout, wherein the data transmission module layout is located on two sides of the phase module layout and away from the divider module layout, and is configured to generate data signals based on a plurality of the second clock signals received; and the output wire is configured to electrically connect a clock signal output terminal of the phase module and a data transmission module in the data transmission module layout, a difference between lengths of any two of the output wires falls within a second preset length range, and the data transmission modules in the data transmission module layout are symmetrically distributed with respect to the divider module layout along the first preset direction.

19. The method of forming a clock tree layout according to claim 18, wherein the output wires comprise first output wires extending along a second preset direction and second output wires extending along the first preset direction, lengths of the first output wires are equal, and the second preset direction is perpendicular to the first preset direction;

at least one of the second output wires is provided with a compensation resistor; and a resistance of the compensation resistor is inversely proportional to a first distance, and the first distance is a distance between the phase module and a corresponding data transmission module in the first preset direction.

20. The method of forming a clock tree layout according to claim 11, further comprising:

forming a ground wire layer, wherein the ground wire layer comprises a plurality of ground wires, and the ground wire is located in the phase module, such that a difference between phases of second clock signals generated by any two of the phase modules falls within the preset precision range.

* * * * *